(12) United States Patent
Ahn et al.

(10) Patent No.: US 8,587,685 B2
(45) Date of Patent: Nov. 19, 2013

(54) METHOD AND APPARATUS FOR RETRIEVING LABEL

(75) Inventors: Hee-Bum Ahn, Seoul (KR); Soo-Hyung Kim, Gwangju (KR); Guee-Sang Lee, Gwangju (KR); Hyung-Jung Yang, Gwangju (KR); Seong-Taek Hwang, Gyeonggi-do (KR); Jung-Sik Kim, Jeollanam-do (KR); Jong-Hyun Park, Jeollabuk-do (KR); Myung-Hun Lee, Gwangju (KR); Jun-Sik Lim, Gwangju (KR); Jong-Mun Jeong, Gwangju (KR)

(73) Assignees: Samsung Electronics Co., Ltd. (KR); Industry Foundation of Chonnam National University (KR)

( * ) Notice: Subject to any disclaimer, the term of this patent is extended or adjusted under 35 U.S.C. 154(b) by 384 days.

(21) Appl. No.: 12/879,624

(22) Filed: Sep. 10, 2010

(65) Prior Publication Data

US 2011/0063468 A1   Mar. 17, 2011

(30) Foreign Application Priority Data

Sep. 11, 2009   (KR) .................. 10-2009-0085937

(51) Int. Cl.
*H04N 5/228* (2006.01)

(52) U.S. Cl.
USPC ....................................... 348/222.1

(58) Field of Classification Search
USPC ....................................... 348/222.1
See application file for complete search history.

(56) References Cited

U.S. PATENT DOCUMENTS

| | | | |
|---|---|---|---|
| 2008/0240702 A1* | 10/2008 | Wassingbo et al. | 396/310 |
| 2008/0279481 A1 | 11/2008 | Ando | |
| 2010/0325563 A1* | 12/2010 | Goldthwaite et al. | 715/757 |

* cited by examiner

*Primary Examiner* — James Hannett
(74) *Attorney, Agent, or Firm* — The Farrell Law Firm, P.C.

(57) ABSTRACT

Disclosed is a method for retrieving a label in a portable terminal. The method includes obtaining a label image photographed through a camera, extracting characters included in the label image and recognizing the extracted characters, detecting at least one label including the recognized character from a label database including multiple labels and information on the multiple labels and constituting a preliminary label candidate group including said at least one label, detecting an image characteristic of the label image, detecting at least one label having an image characteristic, which is similar with the detected image characteristic, from the preliminary label candidate group, and constituting a final label candidate group, and providing each of said at least one label included in the final label candidate group and detailed information corresponding to each of said at least one label.

14 Claims, 13 Drawing Sheets

*Rigoleto*

FIG.10A

*Rigoleto*

FIG.10B

*Rigoleto*

FIG.11A

*Rigoleto*

FIG.11B

*Volnay*

FIG.12A

Volmany

FIG.12B

METHOD AND APPARATUS FOR RETRIEVING LABEL

PRIORITY

This application claims priority under 35 U.S.C. §119(a) to a Korean Patent Application entitled "Method And Apparatus for Retrieving Label" filed in the Korean Industrial Property Office on Sep. 11, 2009 and assigned Serial No. 10-2009-0085937, the contents of which are incorporated herein by reference.

BACKGROUND OF THE INVENTION

1. Field of the Invention

The present invention generally relates to a portable terminal, and more particularly to a method and an apparatus for retrieving a label by using a portable terminal.

2. Description of the Related Art

As a result of the development of low-power, high efficiency, cheap hardware, the domain of the portable terminal has been recently expanded from simple voice calls to an application field employing image storage, reproduction, data communication, image process technologies, etc. Based on the development of the hardware technologies, the portable terminal can include a high-definition camera and provide various functions using the camera. For example, the portable terminal provides a function of character recognition, barcode recognition, face recognition, etc. using an image photographed through the camera.

In the meantime, according to the increase of the interest of people in wine, the demands for wine have increased. The annual domestic consumption of wine increases every year, and a 25% average annual growth rate has been recorded. Further, production of domestic wine and the consumption of imported wine have also increased, and the domestic wine market is expected to increase to $413,000,000 in 2010 according to research. As such, according to the increase of the interest in and the consumption of wine, a wine portal site providing wine information has been created, and online sales of wine, various offline activities, and community activities have been actively run.

As the interest in wine sharply increases, various services related to wine are being generated, and the most general service is to provide information on wine through a web-service. However, user demand varies, and users desire to receive the information on wine anytime and anywhere in a necessary time.

The tastes, kinds, and prices of wine vary according to a producer, a producing region, a species of grapes, a producing year, etc., and such wine information serves as a reference for the selection of wine. A label of wine is uniquely designed according to the wine information, so that a consumer can discriminate a wine through the wine label and obtain information on the wine. However, even if a producer or a brand of wine is the same, but the kinds of the wine are different, the labels may have the similar designs, so that it requires the professional knowledge so as to discriminate between wines.

Therefore, if it is possible to recognize a wine label, retrieve a corresponding wine label by using a recognized result, and provide a user with wine information using a portable terminal, the user, who does not have knowledge of wine, can receive wine information anytime and anywhere.

According to a conventional method for providing wine information, a barcode is attached to a wine label, the barcode is recognized, and then a wine is discriminated, so as to provide corresponding information of the wine. However, in the conventional method, the barcode has to be directly attached to a bottle of wine, so that additional expense is incurred and an additional barcode reader for reading the barcode is required, thereby failing to allow the general user to easily access the method.

SUMMARY OF THE INVENTION

Accordingly, the present invention has been made to solve the above-stated problems occurring in the prior art, and the present invention provides a method and an apparatus capable of retrieving a wine label and providing information on wine anytime and anywhere regardless of a place or a time.

Further, the present invention provides a method and an apparatus capable of retrieving a corresponding wine label by using a wine label image obtained through a camera included in a portable terminal.

Furthermore, the present invention provides a method and an apparatus capable of rapidly and accurately providing information on wine.

In accordance with an aspect of the present invention, there is provided a method for retrieving a label of a label retrieval apparatus, the method including obtaining a label image photographed through a camera; extracting characters included in the label image and recognizing the extracted characters; detecting at least one label including the recognized character from a label database including multiple labels and information on the multiple labels and constituting a preliminary label candidate group including said at least one label; detecting an image characteristic of the label image; detecting at least one label having an image characteristic, which is similar with the detected image characteristic, from the preliminary label candidate group, and constituting a final label candidate group; and providing each of said at least one label included in the final label candidate group and detailed information corresponding to each of said at least one label.

BRIEF DESCRIPTION OF THE DRAWINGS

The above and other aspects, features and advantages of the present invention will be more apparent from the following detailed description taken in conjunction with the accompanying drawings, in which:

FIGS. 10A and 10B illustrate an example of an inclination correction according to an embodiment of the present invention;

FIGS. 11A and 11B illustrate an example of a segmentation of a character area segmentation according to an embodiment of the present invention;

FIGS. 12A and 12B illustrate a result of a character area segmentation according to an embodiment of the present invention;

DETAILED DESCRIPTION OF EMBODIMENTS OF THE PRESENT INVENTION

Figure 1:
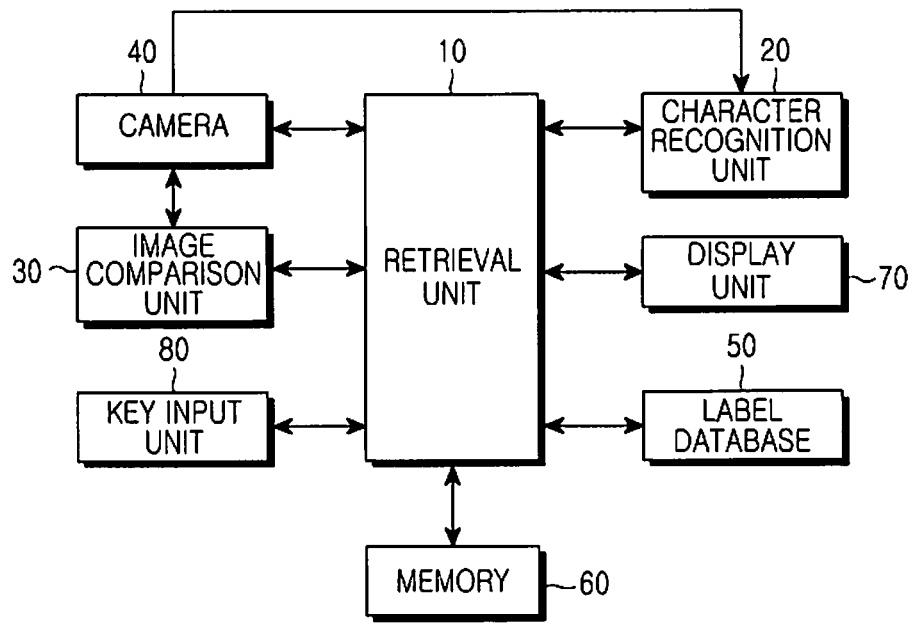
FIG. 1 is a block diagram illustrating the construction of a label retrieval apparatus according to an embodiment of the present invention.

Hereinafter, embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

There are various types of wine and different wine labels. However, if a producer or a brand of wine is the same, the labels have similar designs, so that a beginner cannot easily discriminate between different wines. Further, there are multiple wine labels, which may include the same terms, but have entirely different designs, to be discriminated as different labels, so that it is more difficult to discriminate a label and accurately recognize wine information included in a corresponding label.

The present invention allows a user to rapidly and accurately recognize a label by using a photographed image of a label (e.g. a wine label), which includes characters and is in a specific design, retrieving a corresponding label, and then providing the user with relevant information.

To this end, the present invention extracts characters from a label image obtained through photographing and recognizes the character, retrieves the recognized characters in a label database, detects reference label images including the same character, and constructs a preliminary label candidate group including the reference label images. Then, the present invention detects an image characteristic representing a characteristic of a label design from the label image and detects reference label images including the similar image characteristic from the preliminary label candidate group, to provide the user with the detected reference label images. With regard to this, it may be possible to provide various information related to the detected reference label images, for example, a product, company information, etc. corresponding to the corresponding label.

Hereinafter, in order to help the understanding of the present invention, a description will be given on an example of discriminating a wine label among various types of labels. However, the present invention can be similarly applied to a discrimination of other labels, e.g. labels of various drinking water, clothing trademarks, company trademarks, etc.

According to an embodiment of the present invention, a portable terminal obtains wine label images through a digital camera mounted in the portable terminal, recognizes characters indicated in a wine label through a pre-processing, retrieves the label image in a preliminary label candidate group obtained through the retrieval of the recognized character, and then provides the user with information on wine in a sequence of the most similar label image.

When the portable terminal recognizes a wine label attached to a bottle of wine, due to a curved surface of the bottle, a wine label image has an irregular characteristic that an illumination shape is changed as the wine label image retreats farther in a left or a right direction from a center of the wine label. Therefore, it is not easy to accurately segment a background and a character area in a character area detection process and a binarization process. As a result, the character area becomes distorted, so that it may be difficult to recognize a shape of the character. Such a result renders the unique information of the character unclear and results in an important reason for mis-recognition in the recognition process. Therefore, it is necessary to analyze a structural characteristic of a curved label attached on a bottle of wine, and detect and binarize a character area having an exact structure.

A method for recognizing a character is generally classified into three methods. The first method considers an entire word as a single unit without a character segmentation process and recognizes a character. The second method generates only a single segmentation result having a high reliability in a character segmentation process. The third method transfers multiple segmentation results to a recognition process and determines a word segmentation result while recognizing the characters.

The first method, i.e. the word unit recognition method, can obtain a high recognition performance only with a characteristic of a wide pattern distance between words and usually results in non-accurate performance, so that it may be usefully used in an application field in which the number of used words are extremely limited. However, there are a lot of used words in most of the application fields. Therefore, a pattern distance between the words is close and a lot of similar words are included, so that the use of the precise characteristic close to the character recognition is required, thereby failing to use the advantage of this method.

The second method refers to the external segmentation method, and can achieve a fast processing speed, so that it is widely used in the recognition of a printed word, in which characters are relatively and easily segmented into a character. However, when the characters are incorrectly segmented, it is impossible to correct the character segmentation. Therefore, an error is generated during the character segmentation process and may fatally influence the entire recognition process.

The third method refers to the internal segmentation method, and receives the results of the segmentation of multiple characters, thereby improving a character recognition performance. However, multiple repetitions of character recognitions are usually required, so that there is a big burden on the processing speed. In the meantime, most of the character recognition devices have various limitations for high recognition performance, so that it is inconvenient to use the character recognition device.

Therefore, in order to improve the accuracy of the character recognition, the highly reliable character segmentation method, which maximally decreases the burden on the processing speed in the recognition process, while using the internal segmentation method, is required.

An image used in character recognition is formed with character piece areas. Therefore, a single character can be segmented into several character pieces, and the segmentation of the single character into the several character pieces can be performed based on a binarization image and a location value of each of the character pieces.

Therefore, the present invention generates combined characters based on a binarization image and a location value of each of the character pieces, measures a similarity between the generated combined characters and reference characters, and extracts an optimum character combination, and performs a post-processing, to improve the recognition performance of the characters.

A result obtained through recognizing and retrieving characters included in a wine label is generated as a candidate group including a single wine label or multiple wine labels. In order to retrieve the wine label that is most similar with a wine label image included in the candidate group, the present invention uses image characteristics obtainable from a wine label.

FIG. 1 illustrates a label retrieval apparatus according to the present invention. The label retrieval apparatus can be included in a portable terminal, e.g. a mobile phone, a PDA, and the like. Referring to FIG. 1, the label retrieval apparatus includes a retrieval unit 10, a character recognition unit 20, an image comparison unit 30, a camera 40, label database 50, a memory unit 60, a display unit 70, and a key input unit 80.

The key input unit 80 includes a shutter key for controlling a photographing of the camera 40, various functional keys, number keys, etc. Further, the key input unit 80 outputs key data corresponding to various key inputs, which are generated when a user presses any key, to the retrieval unit 10.

The memory unit 60 stores programs for processing and controlling of the retrieval unit 10, reference data, various renewable storage data, etc., which are provided to a working memory of the retrieval unit 10. Further, the memory unit 60 stores a preliminary label candidate group and a final label candidate group.

The label database 50 includes reference wine label images corresponding to various wine labels, label character strings included in each of wine labels, and detailed information on wine corresponding to each of the wine labels. The detailed information includes a kind of corresponding wine, a producing area, a producing year, a producing region, history, etc. Further, the label database 50 stores image characteristics of each of the reference wine label images. The label database 50 can also be part of the memory unit 60.

The camera 40 outputs, according to a control of the retrieval unit 10, an image generated through photographing a subject to the character recognition unit 20 and the image comparison unit 30. That is, when the user photographs a wine label with the camera 40, a wine label image is obtained and the obtained wine label image is output to the character recognition unit 20 and the image comparison unit 30.

The character recognition unit 20 wavelet transforms, according to a control of the retrieval unit 10, the wine label image so as to detect a character area from the input wine label image and analyzes frequency transform components of a horizontal line, a vertical line, and a diagonal line. A part having a large frequency change among the three frequency transform components corresponds to a character area. The character recognition unit 20 detects a character area and then performs a binarization, which segments the detected character area into a character area and a background area. Therefore, the character area represents a character itself in the label image, and an adaptive threshold algorithm can be applied to the binarization. The character recognition unit 20 segments a binarized character area based on each of the characters and recognizes each of the characters preferably by using a neural network, and constructs at least one candidate character string by using the recognized characters. Further, the character recognition unit 20 compares the candidate character strings with wine label character strings registered in the label database 50 and outputs a wine label character string having the highest similarity as a final recognition result, to the retrieval unit 10.

The retrieval unit 10 controls the general operation of the label retrieval apparatus. The retrieval unit 10 retrieves at least one wine label including the recognized wine label strings in the label database 50 by using the final recognition result input from the character recognition unit 20, and constructs a preliminary label candidate group including reference wine label images corresponding to the retrieved wine label. Then, the retrieval unit 10 controls the image comparison unit 30 in order to retrieve a reference wine label image similar with the wine label image obtained through the photographing in the preliminary label candidate group.

The image comparison unit 30 extracts image characteristics of the wine label image input by the camera 40. At this time, the extracted image characteristics include a size characteristic of the character area extracted by the character recognition unit 20, a color characteristic of a wine label image, and a design characteristic of a character. Further, the image comparison unit 30 calculates a similarity between the extracted image characteristics with image characteristics of the reference wine label images included in the preliminary label candidate group, constructs a final label candidate group including reference wine label images having the high similarity, and outputs the final label candidate group to the retrieval unit 10.

The retrieval unit 10 detects the reference wine label images included in the final label candidate group and information of the corresponding wine from the label database 50 and displays the detected reference wine label images and the information of the corresponding wine on the display unit 70, thereby providing the user with a wine label retrieval result and the wine information.

Figure 3:
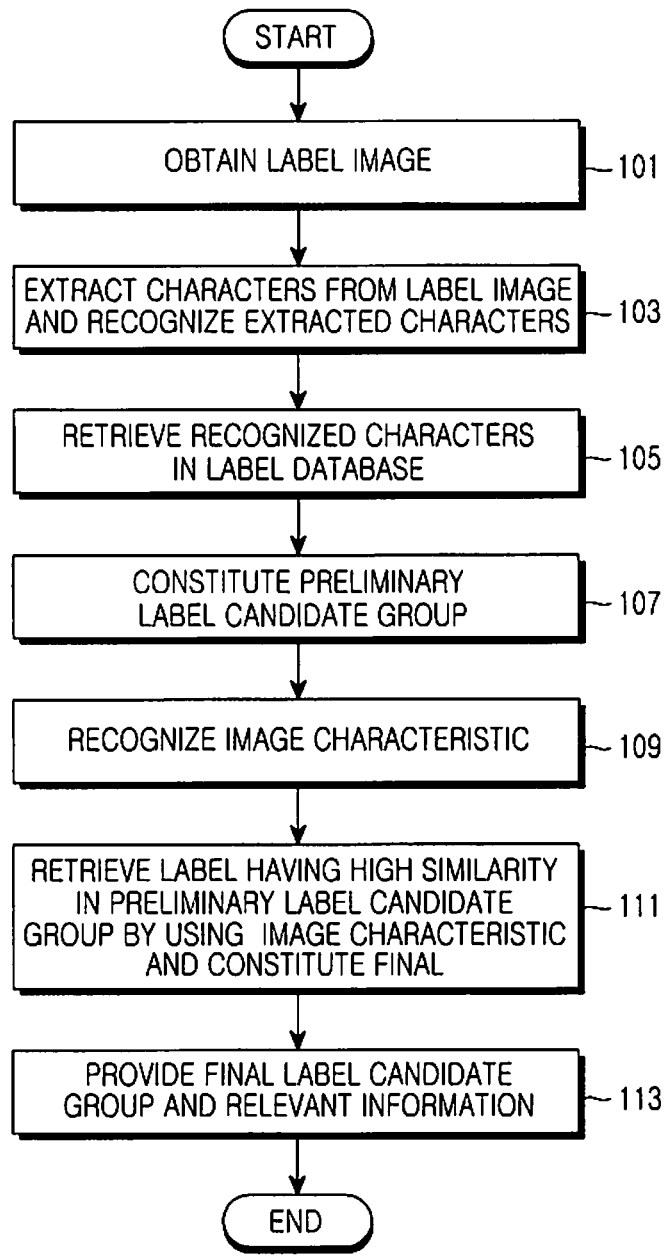
FIG. 3 is a flowchart illustrating the operation of a label retrieval apparatus according to an embodiment of the present invention.
Figure 4A:
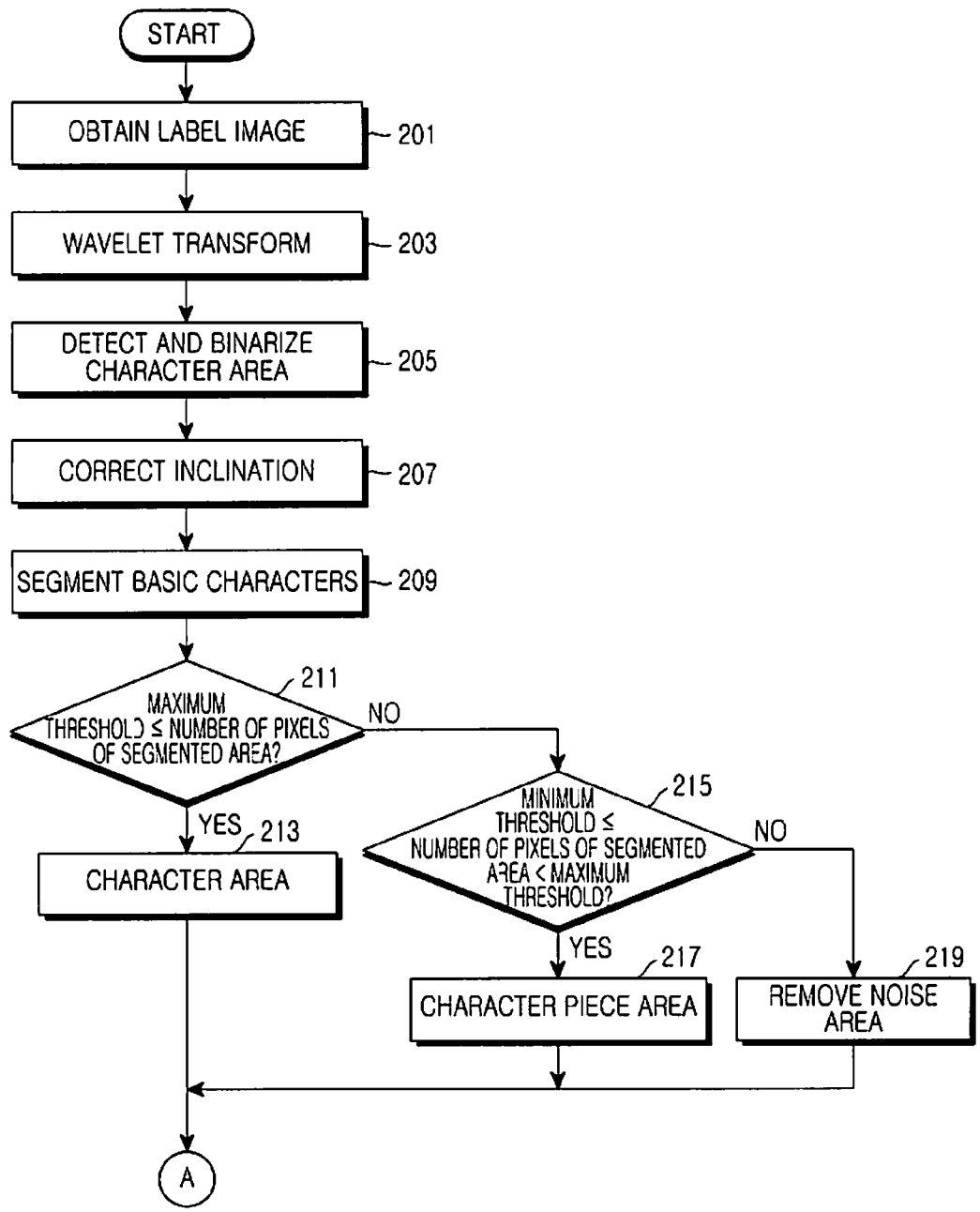
FIGS. 4A and 4B are flowcharts illustrating the operation of a character recognition unit according to an embodiment of the present invention.
Figure 4B:
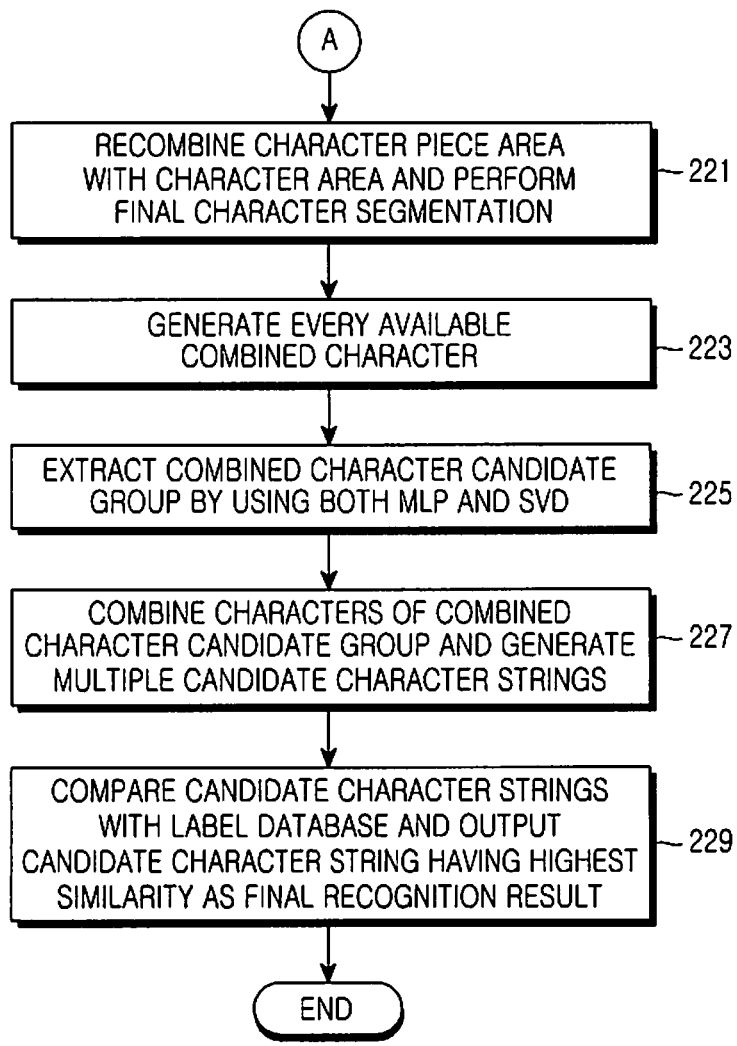
Figure 5:
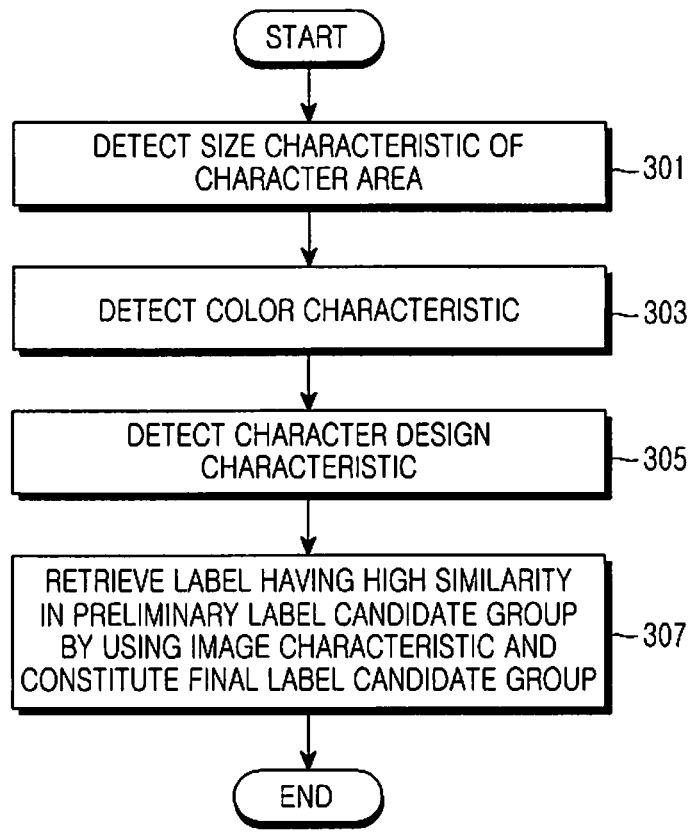
FIG. 5 is a flowchart illustrating the operation of an image comparison unit according to an embodiment of the present invention.

FIGS. 3 to 5 illustrate an operation of the label retrieval apparatus including the above elements. FIG. 3 is a flowchart illustrating the general label retrieval process of the label retrieval apparatus according to an embodiment of the present invention, FIGS. 4A and 4B are flowcharts illustrating the operation of the character recognition unit 20 according to an embodiment of the present invention, and FIG. 5 is a flowchart illustrating the operation of the image comparison unit 30 according to an embodiment of the present invention.

When the user requests a wine label retrieval through the key input unit 80, the wine label retrieval apparatus activates the camera 40. The user photographs a wine label attached to a bottle of wine to be retrieved by using the camera 40 included in the label retrieval apparatus.

Figure 6:
FIG. 6 illustrates a label image according to an embodiment of the present invention.

The label retrieval apparatus obtains a wine label image as shown in FIG. 6 in step 101 of FIG. 3. The camera 40 outputs the label image to the character recognition unit 20 and the image comparison unit 30. Then, the retrieval unit 10 controls the character recognition unit 20, extracts characters from the label image, and recognizes an extracted characters in step 103. The corresponding operation of the character recognition unit 20 will be described with reference to FIGS. 2, 4A, and 4B.

Figure 2:
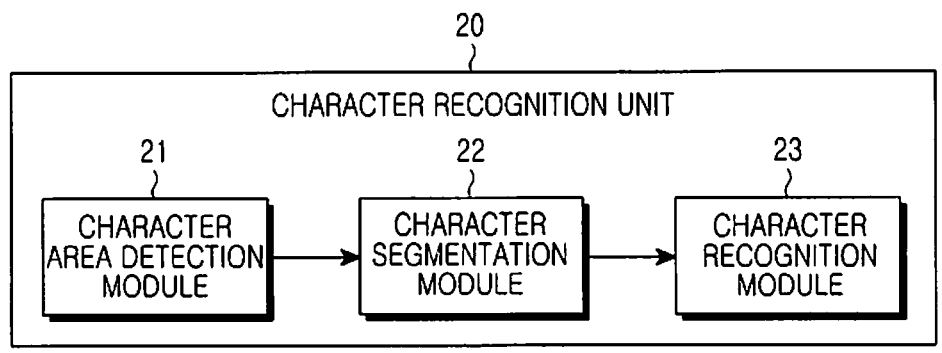
FIG. 2 is a block diagram illustrating the construction of a character recognition unit according to an embodiment of the present invention.

FIG. 2 is a diagram illustrating the construction of the character recognition unit 20 according to an embodiment of the present invention. Referring to FIG. 2, the character recognition unit 20 includes a character area detection module 21, a character segmentation module 22, and a character recognition module 23.

Referring to FIGS. 4A and 4B, when the label image is input through the camera 40, the character recognition unit 20 obtains the label image in step 201. Then, in order to successfully detect characters included in the wine label image, the character recognition unit 20 wavelet transforms the label image, analyzes a directional component of a high frequency area, expands a candidate character area, and detects an accurate character area by using a grouping and a vertical histogram and a horizontal histogram. Then, the character recognition unit 20 binarizes the detected character area by using an adaptive boundary algorithm.

Therefore, the character area detection module 21 of the character recognition unit 20 wavelet transforms a gray scale component of the label image for the detection of the character area in step 203. In step 205, the character area detection module 21 performs the wavelet transform, and then generates a candidate character area by using a directional component of a character area including the High Frequency (HF) component, i.e. a Vertical (V), a Horizontal (H), and a Diagonal (D) directional component, in the photographed label. The grouping of the areas can extend the character area according to the directional components by applying three different sub masks based on its vertical, horizontal, diagonal characteristics.

With regard to this, it is assumed that a representative character of the wine in the wine label is approximately located in a center of the wine label image, and an example of used algorithm is represented in Table 1.

TABLE 1

Figure 7A:
FIGS. 7A to 7E illustrate a process of a character area detection according to an embodiment of the present invention.
Figure 7B:
Figure 7C:
Figure 7D:
Figure 7E:
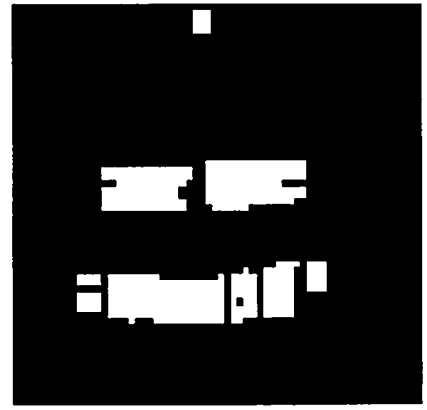

1 step: computing mean value in HFV, HFH, and HFD
detecting directional component(V,H,D)
if(mean × C<coef) img[ ][ ] = 255;
else img[ ][ ] = 0;
2 step: region grouping
HFV: 1×11
HFH: 11×1
HFD: 3×5
3 step: text region detection
If(V∩(HUD)) textregion;
else background;

FIGS. 7A to 7E illustrate a detection result of the character area according to an embodiment of the present invention. FIG. 7A is an original of the wine label image, FIG. 7B shows a horizontal directional expansion of the candidate character area extracted from the wine label area of FIG. 7A, FIG. 7C shows a vertical directional expansion of the candidate character area extracted from the wine label area of FIG. 7A, FIG. 7D shows a diagonal directional expansion of the candidate character area extracted from the wine label area of FIG. 7A, and FIG. 7E shows a result of the detection of the finally derived candidate character area by using FIGS. 7B and 7C by the algorithm of Table 1.

The character area detection module 21 analyzes a characteristic of a vertical area histogram and a horizontal area histogram of the candidate character area detected through the analysis of the high frequency components obtained through the wavelet transforming and detects an actual character area. Then, the character area detection module 21 segments the actual character area detected through an application of the adaptive boundary algorithm into a background area and a character area. The segmented character area corresponds to an area constituting an actual character. For example, the segmented character area represents an area constituting "BLUE NUN".

Figure 8:
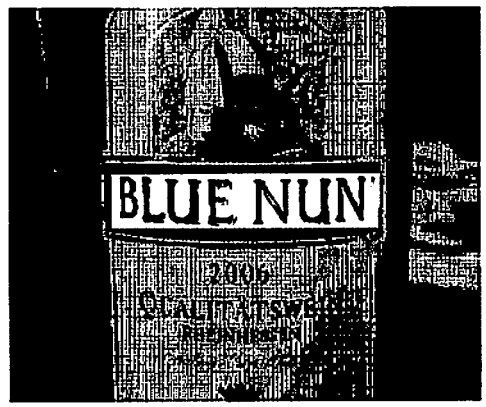
FIG. 8 illustrates a binarization result according to an embodiment of the present invention.

The general characteristic of illumination of a curved surface image, such as a bottle of wine, is bright in a central area and becomes darker as it retreats to a left or a right area. Therefore, in the present invention, the adaptive threshold algorithm is applied in order to perform the binarization. An example of a result of the binarization processing is shown in FIG. 8.

Returning to FIG. 4A, the character segmentation module 22 of the character recognition unit 20 corrects an inclination of the character area detected by the character area detection module 21 in step 207, and segments the character in step 209.

The correction of the inclination in the segmentation-based character recognition method is very important. The misapplied inclination correction distorts an input character string enough to not be used. Such a distortion derives an incorrect character segmentation and finally results in recognition failure.

The inclination correction related to the character recognition can be basically realized through extracting straight line components from the entire input character strings and then obtaining the inclinations of the extracted components. The present invention uses a horizontal run for the extraction of the straight line components.

Figure 9:
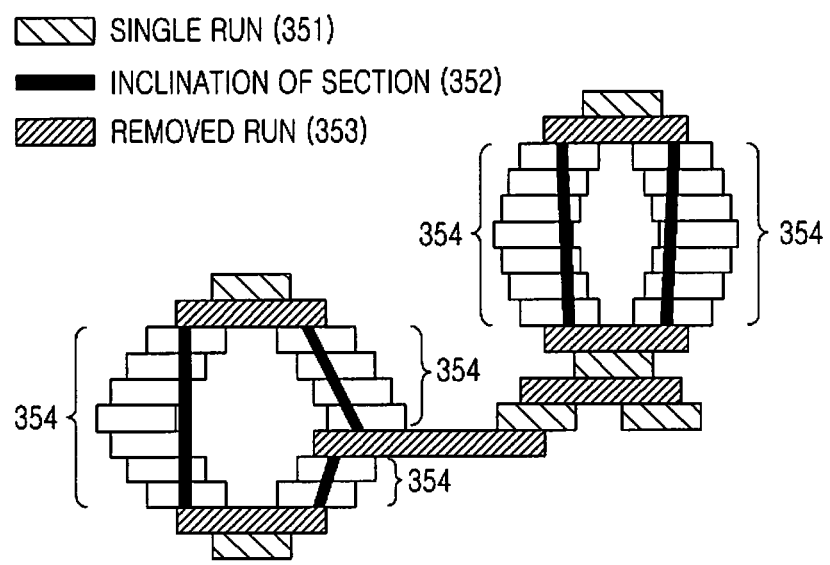
FIG. 9 illustrates an inclination according to an embodiment of the present invention.

FIG. 9 illustrates an inclination of a defined section according to an embodiment of the present invention. Referring to FIG. 9, if a length of a run in horizontal runs forming a binary character area is longer than an average run length, a corresponding run is deleted 353. Then, the remaining runs are connected, to form a single section 354. The section including one run, i.e. section 354 including a single run 351 is determined to have no special information, so that the section including the single run 351 is ignored, and an inclination 352 of section 354 including at least two runs is measured and corrected. At this time, section 354 including many runs is determined to have more information, so that weight is given to the inclination as much as the number of runs.

If the number of total runs is n, the number of total sections is m, the number of runs in each section is $r_k$, and an inclination of each section is $\Theta_k$, an average inclination of a straight line component $\Theta_{avg}$ is expressed by Equation (1).

$$\Theta_{avg} = \sum_{k=1}^{m} \frac{r_k \times \Theta_k}{n}, k = 1, \ldots, m \qquad (1)$$

The character segmentation module 22 corrects the binarized character area by using an average inclination obtained by Equation (1). Examples of the binarized character area corrected as much as the average inclination are shown in FIGS. 10A and 10B. FIG. 10A is an original of the binarized character area and FIG. 10B is the inclination-corrected character area.

When the inclination correction has been completed, the character segmentation module 22 derives segmentation candidate points by using a characteristic of a contact point between syllables for the segmentation of basic characters in step 209 of FIG. 4A. If a contact portion between English letters is formed in a valley shape, there is a high probability in that such a contact portion corresponds to the segmentation candidate point. Using such a feature, when at least two higher runs are included in a horizontal run structure, the midpoint between two higher runs is set as a segmentation point.

The segmentation points presented in the extracted character area in FIG. 10B are shown in FIG. 11A. However, referring to FIG. 11A, it can be seen that unnecessary segmentation points have been found. The unnecessary segmentation points correspond to pixels, of which upper or lower sections are closed with respect to the segmentation points, or long pixels extending in the Y-axis direction with respect to the segmentation points. Therefore, the character segmentation module 22 removes the unnecessary segmentation points and segments the character area based on the remaining segmentation points. The state in which the unnecessary segmentation points have been removed, is shown in FIG. 11B.

In the present invention, the character string included in the extracted character area is excessively segmented within an optimum level, and then the segmented character areas are re-combined in the recognition process as necessary. However, if the character area is segmented into too many character areas, a large burden is created on the processing speed during the recognition process. Therefore, when the segmented area including a single character among the segmented areas is segmented, through recombining of the segmented areas, it is possible to reduce the processing time during the recognition process.

Therefore, the character segmentation module 22 classifies the segmented area into a noise area, a character piece area, and an effective character area based on an average number of pixels of each of the segmented areas. The effective character area includes any character and can increase a high character recognition rate. The noise area is an area other than the areas including the character or an area having a size smaller than a reference size. The noise area does not increase a high correctness in the character recognition and may deteriorate the recognition rate, so that the noise area is removed. The character piece area corresponds to an effective area constituting any character, but is an area separate from the corresponding character. That is, the character piece area refers to an area where the remaining area of a character related to the character piece area is mostly located on a vertical line. Therefore, when the number of connection pixels of each segmented area is equal to or less than a threshold range, the character piece area is re-combined with another effective character area existing on the same vertical line. If another effective character area is not located on the same vertical line, the character piece area is determined to be a noise area, and is removed.

Steps 211 to 221 of FIGS. 4A and 4B illustrate a character re-combination process. In step 211 of FIG. 4A, the character segmentation module 22 identifies if the number of pixels of the segmented area is greater than or equal to a maximum threshold. The maximum threshold is determined based on an average number of pixels of each of the segmented areas, and for example, may be 30% of the average number of pixels. When the number of pixels of the segmented area is greater than or equal to the maximum threshold, the character segmentation module 22 determines the corresponding area to be an effective character area in step 213 and proceeds to step 221 in FIG. 4B.

When the number of pixels of the segmented area is less than a maximum threshold in step 211, the character segmentation module 22 identifies if the number of pixels of the segmented area is less than a minimum threshold in step 215. When the number of pixels of the segmented area is less than the minimum threshold as a result of the identification, the character segmentation module 22 determines the corresponding area as a noise area and removes the corresponding area in step 219, and proceeds to step 221 in FIG. 4B. The minimum threshold may be 10% of the average number of pixels. If the number of pixels of the segmented area is greater than or equal to the minimum threshold and less than the maximum threshold, the character segmentation module 22 determines the corresponding area as a character piece area in step 217 and proceeds to step 221 in FIG. 4B. The character segmentation module 22 recombines the character piece area and the effective character area and finally completes the character segmentation in step 221.

Then, the character recognition module 23 of the character recognition unit 20 generates every available combined character, i.e. temporal combined characters, by using the finally segmented character areas, i.e. the segmented character areas, in step 223.

According to the present invention, when the total number of segmented character areas is M, M is larger than N, which is the number of characters constituting the character string included in the label. Hereinafter, each of M segmented character areas is indicated as Si, and i is a natural number from 0 to M.

A word recognition algorithm according to the present invention is based on two assumptions given on the segmented character areas. First, Si represents a part of a single character or an entire character. Second, a single character maximally includes $\alpha$ number of image pieces. The first assumption implies that Si cannot include partial images of two or more of the characters. This assumption is based on the word recognition algorithm, which segments a character area constituting a character string included in a label into several character segments and then retrieves a combination constituted with optimum groups corresponding to characters within the character string.

Figures 12A, 12B:
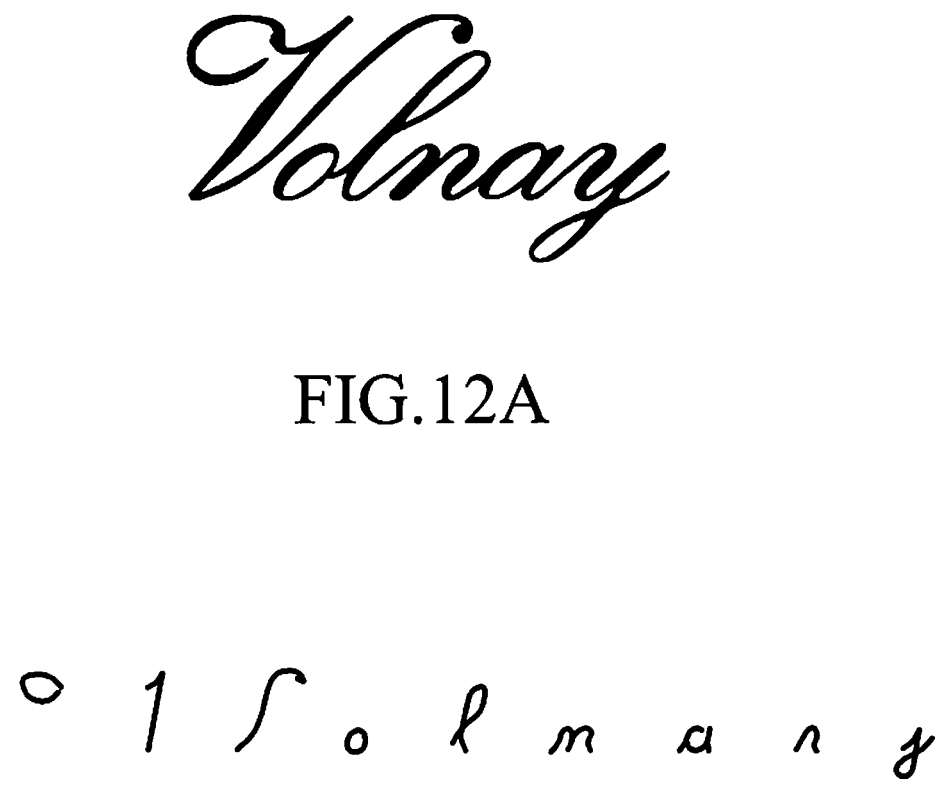

FIGS. 12A and 12B show examples, in which a character area corresponding to the character string, "Volnay", included in a wine label image is excessively segmented into 8 image pieces. The word recognition algorithm according to the present invention has a goal of finding an optimum combination, which includes "V" formed with first three image pieces among 8 image pieces and "olnay" formed with each of the remaining characters.

Figure 13:
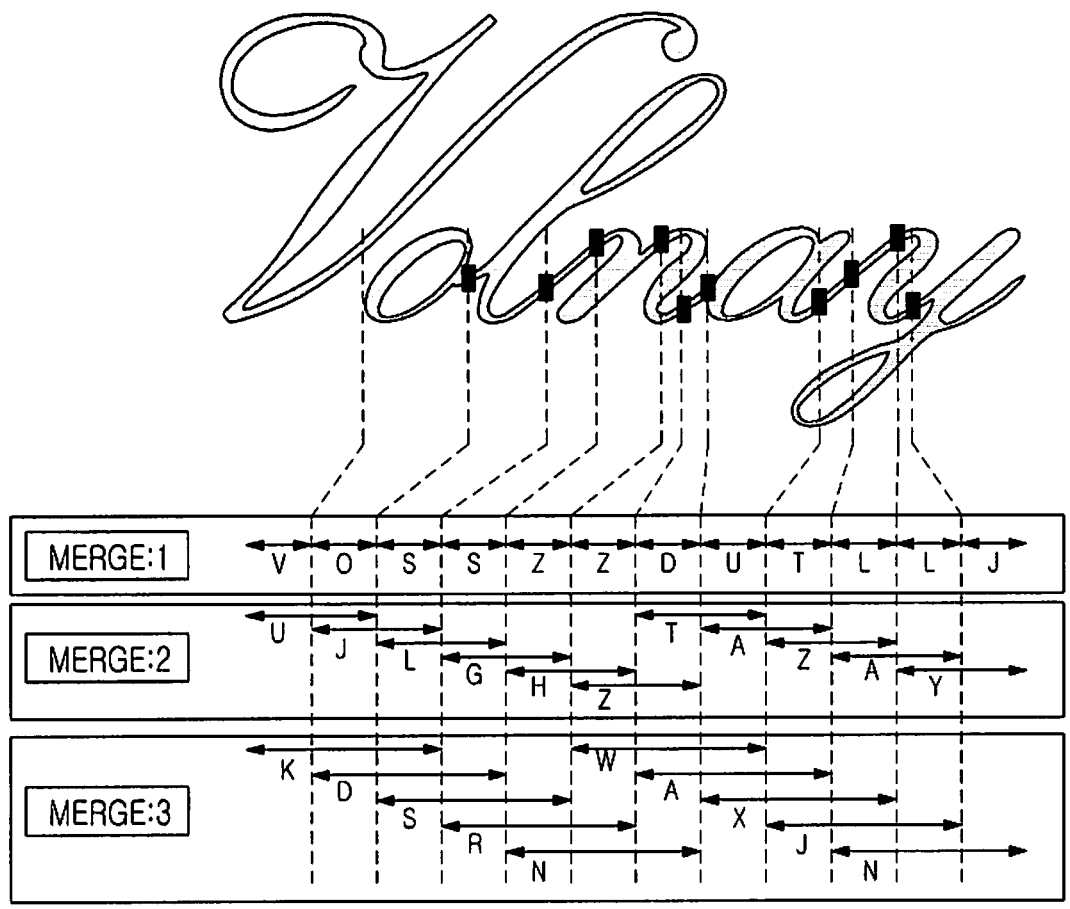
FIG. 13 illustrates a process of a combined character generation according to an embodiment of the present invention.

The character recognition module 23 retrieves every available combination of the segmented character areas segmented by the character segmentation module 22. The recognition method through the excessive segmentation combines the segmented character area in a sequence of the segmentation as shown in FIG. 13 and extracts a recognition result. In order to compare the recognition result with the character to be recognized, the character recognition module 23 has to select a combinable character set and generate the combined characters.

Here, the combinable character set is as follows: When the recognition result is r, and the recognition result of the combined character is $r_{(a,b)}$ (where, "a" denotes a piece with which the combination begins and "b" denotes the number of pieces used in the combination), the combination of $r_{(0,3)}$ and $r_{(1,1)}$ is not allowed. The reason is that the combination has been performed using the 0, $1^{st}$, and $2^{nd}$ pieces in $r_{(0,3)}$, so that $r_{(1,1)}$, which has used the $1^{st}$ piece, cannot be used for the combination. Therefore, such a character combination satisfying the above condition is generated and used in a post-processing.

In order to generate the combination with M segmented character areas, first, information on the maximum number and the minimum number of words to be recognized should be given.

In the present embodiment, only the words corresponding to a name of the wine label are limited to a recognition subject, so that the minimum number of words is 1 and the maximum number of the words is 3. Therefore, the character recognition module 23 derives available combinations by using the information on the number P of words, and generates a combination matrix as information on the combinations. A size of the combination matrix can be obtained by an inductive method as follows.

The number of available combinations with the last piece, SM, is 1. Since the available combinations in SM-1 are {SM, SM-1}, {GM, M-1}, the number of available combinations is 2. With regard to this, GM and M-1 are the characters in which SM is combined with SM-1. The available combinations in SM-2 are {SM-2, SM, SM-1}, {SM-2, GM, M-1}, {GM-1, M-2, SM}, and {GM, M-1, M-2}, so that the number of available combinations is 4. The available combinations in SM-3 are {SM-3, SM-2, SM, SM-1}, {SM-3, SM-2, GM, M-1}, {SM-3, GM-1, M-2, SM}, {SM-3, GM, M-1, M-2}, {GM-2, M-3, SM, SM-1}, {GM-2, M-3, GM, M-1}, and {GM-1, M-2, M-3, SM}, so that the number of available combinations is 7. Here, the number of available combinations in SM-3 is the sum of the number of available combinations in SM-2, the number of available combinations in SM-1, and the number of available combinations in SM. Therefore, the number of available combinations in S1 is the sum of the number of available combinations in S2, the number of available combinations in S3, and the number of available combinations in S4. The temporal combined characters are generated in a number equal to the number of combinations corresponding to each Si.

Further, the combination matrix can be obtained through the dynamic programming method in the same way as the method for calculating the number of combinations. The combination matrix in SM-3 can be obtained through adding SM-3, GM-2, M-3, GM-1, M-2, and M-3 to a front of SM-2, SM-1, and SM combination matrixes, respectively, so that it is possible to minimize the time required for the additional matrix calculation. Further, the present word recognition algorithm recognizes the word through matching each of the combinations formed by the dynamic programming method with each word in a dictionary, so that the number of combinations generated within the given number of image pieces is greatly related to a word recognition rate of the present method.

The character recognition module 23 derives an optimum combination from the combinations found during the above processes. Each row of the combination matrix represents a combination that can be matched with the word having a size of P. The character recognition module 23 previously performs the character recognition of each element Gn of the combination, i.e. the generated combined character, before matching the single combination Si with the word having a size of N in the dictionary Dn. With regard to this, elements to be recognized in the group Gn are limited to characters on a unigram dn(N) including the characters located in the $n^{th}$ location of the words included in the dictionary Dn.

As the number of segmented character areas increases, the processing time increases by geometric progression. Therefore, the large number of segmented character areas results in difficult recognition of cursive characters extracted from the wine label by the portable terminal. In order to solve the above problem, the character recognition module 23 compares the temporal combined characters according to the recognition result with a recognition result of the temporal combined characters and extracts an optimum combined character candidate group in step 225 in FIG. 4B.

That is, in step 225, the character recognition module 23 extracts a directional segment feature of each of the temporal combined characters generated according to the present invention, performs in advance an MLP (Multi Layer Perceptron) process based on the extracted directional segment feature, temporarily recognizes a corresponding temporal combined character as a specific character, evaluates a correctness of the specific character with an SVD (Singular Value Decomposition) process, and forms the combined character candidate group. With regard to this, as the similarity between the combined character and the specific character is higher, the correctness is higher, and the combined characters belonging to the combined character candidate group are the combined characters having a predetermined degree of the correctness ranking or higher.

The MLP process used in the recognition process derives only the recognition result, but does not calculate the similarity between the input image, i.e. the combined character, and the recognition result. However, there is an advantage in that the recognition process is very simple and it is possible to minimize the processing time. In the derivation of the recognition result, the SVD process can extract the similarity, but requires a large quantity of calculations. In order to solve such a problem, the present invention appropriately combines the MLP and the SVD processes.

That is, when it is assumed that a characteristic of an input image used in MLP is $F_{(1)}$ and a characteristic stored in the database corresponding to the recognition result C is $F_{(C)}$, the character recognition module 23 evaluates $F_{(1)}$ and $F_{(C)}$ with SVD and measures the similarity. Then, the character recognition module 23 calculates an average of the similarities of the characters used in the combination and determines the average similarities as a similarity of the combined character.

With regard to this, it has been noted that the time required for the character recognition when MLP is combined with SVD may be shorter than that required for the character recognition when only SVD is used.

It is assumed that the English letter is recognized, a processing time of MLP is $T_{(M)}$, and the processing time of the SVD is $T_{(S)}$. In this case, when MLP is combined with SVD according to the present invention, the time T required for the character recognition can be expressed by Equation (2).

$$T=T_{(M)}+(T_{(S)}/26) \qquad (2)$$

A corresponding alphabet letter is determined among 26 alphabet letters according to the result of MLP with respect to any combined character, and above any combined character and the determined alphabet letter are evaluated with SVD, to obtain the similarity, so that time T is expressed by Equation (2).

The processing time is $T_{(S)}$ when only SVD is used, so that if $T_{(M)}<(T_{(S)}/26)*25$ is maintained, it is possible to curtail the time required for the final character recognition.

Since the directional segment feature is extracted by considering the left-right directional component and the diagonal directional component of each pixel in the character area, it is possible to extract a feature robust to a skew of the character and the processing process is simple, so that the processing time can be minimized. Further, in order to measure the diagonal directional feature in the extraction of the directional segment feature, the image is rotated 45°. The rotation of the image may cause an increase in processing time and a change in the feature of the image, so that the value of the diagonal directional component is approximated using a trigonometrical function without rotation of the image. The processing of the diagonal segment feature can include following steps.

First, a horizontal directional component (Hxy) with respect to each pixel (x,y) is obtained. Also, a vertical directional component (Vxy) with respect to each pixel (x,y) is obtained. Then, a contribution (Dxy) is obtained by the horizontal directional component (Hxy) and the vertical directional component (Vxy).

In order to extract the feature without changing the shape and the size of the character area in the character extraction process, a nonlinear segmentation having a feature independent of the size of the character area is performed. The nonlinear segmentation involves complicated processing in comparison with a linear segmentation, but it is possible to omit the process of the conversion of the character area and overcome distortion caused by the change of the size of the character area.

The nonlinear segmentation process can be divided into the following steps. First, a horizontal directional histogram and a vertical directional histogram of the character area are obtained. Then, the sum of each of the histograms is obtained and the obtained sum is segmented by a size of N of a mesh to be segmented, to obtain a threshold of each of the histograms. Next, each of the histograms is segmented according to the threshold and an original image is segmented by a horizontal segmentation value and a vertical segmentation value.

In the nonlinear segmentation, the segmentation sizes are variously extracted, to be compared and analyzed, and the highest performance has been represented when a mesh of 5*7 is used and the number of characteristic vector dimensions is 5*7 (35).

Further, in order to evaluate the similarity for the evaluation of the correctness of the combined character with the recognition result, SVD (Singular Value Decomposition) and cosine similarity are used. The SVD process in linear algebra is one of the important methods for the decomposing of a rectangular matrix, and is widely used in signal processing and a statistics field. Further, SVD may be a generation of a spectrum theory of a matrix with respect to any rectangular matrix. Using the spectrum theory, it is possible to decompose an orthogonal rectangular matrix to a diagonal matrix based on a unique value.

It is assumed that a matrix M is an m×n matrix including elements of a real or complex number set K. At this time, M can be expressed by a multiplication of three matrixes as given in Equation (3).

Here, U is an m×m unitary matrix, Σ is an m×n matrix, the diagonal elements of which have a non-negative number and the remaining elements of which have a value of 0, and V* is a conjugate matrix and represents an n×n unitary matrix. As such, the multiplication of the three matrixes is referred to as the SVD of M. In general, the larger value between Σ i and i is first written and in this case, Σ is solely determined according to M.

$$M = U\Sigma V^* \quad (3)$$

The cosine similarity between the singular value obtained through the SVD of the characters included in the dictionary and the characteristic vector of the input character is calculated. As the cosine similarity has a smaller value, the character is determined to have the higher similarity. The cosine similarity can be expressed by Equation (4).

$$\cos\theta = \frac{X \cdot Y}{|X||Y|} \quad (4)$$

In FIG. 4B, when the combined character candidate group has been completely extracted through the above process, the character recognition module 23 combines the characters in the combined character candidate group and generates multiple candidate character strings in step 227, and proceeds to step 229. At this time, the combined character candidate group can include a predetermined number of combined characters in a sequence of the higher similarity among the multiple combined characters. In step 229, the character recognition module 23 compares the candidate character strings with the label database and outputs the candidate character string having the highest similarity as a final recognition result.

Figure 14:
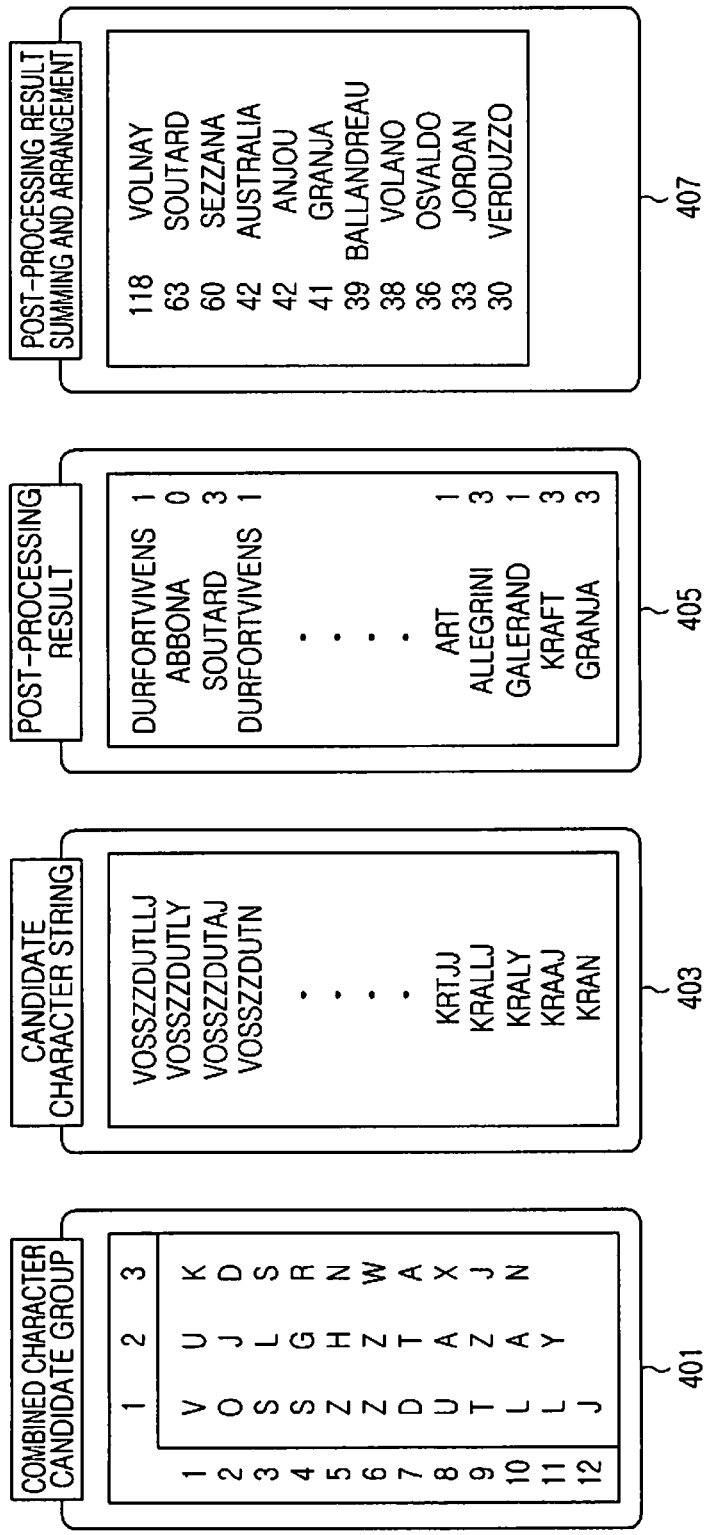
FIG. 14 illustrates a recognition result according to an embodiment of the present invention.

FIG. 14 illustrates an example of the combined character candidate group 401, the candidate character strings 403 generated by the combined character of the combined character candidate group 401, a post-processing result 405 representing a comparison process between the candidate character strings 403 with the label database 50, and a post-processing result summing and arrangement list 407, which sums the post-processing results and then represents the results in a sequence of the higher ranking.

When the character recognition has been completed through the processes of FIGS. 4A and 4B, the character recognition unit 20 transfers the result of the character recognition to the retrieval unit 10. Returning to FIG. 3, the retrieval unit 10 searches the label database by using the candidate character string input as a result of the final recognition result from the character recognition unit 20 in step 105. Then, the retrieval unit 10 constitutes a preliminary label candidate group including the wine labels including the candidate character string in step 107. This is because that according to the characteristic of the wine label, even if the wine labels include the same character string, but have different designs, the wine labels can be classified as different wine labels.

Then, the retrieval unit 10 controls the image comparison unit 30 and recognizes an image characteristic of the label image in step 109. The retrieval unit 10 retrieves a label having the high similarity in the preliminary label candidate group by using the image characteristic detected by the image comparison unit 30 while linking with the image comparison unit 30 and constitutes a final label candidate group in step 111.

Figure 15:
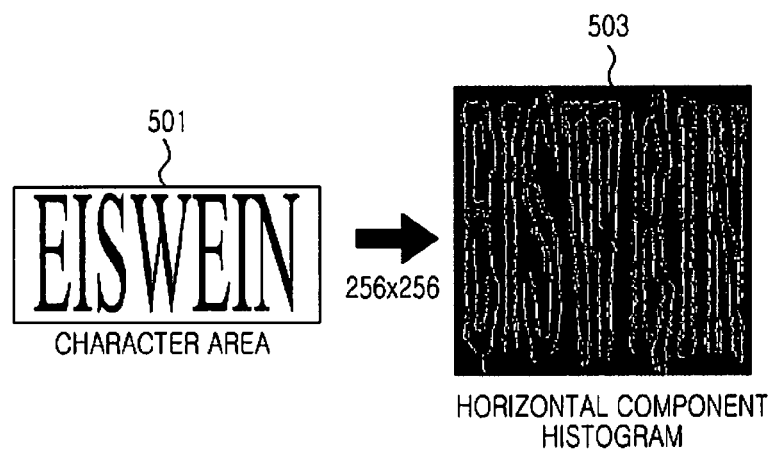
FIG. 15 illustrates a characteristic of a character design according to an embodiment of the present invention.

The operation of the image comparison unit 30 will be described with reference to FIG. 5. As illustrated in FIG. 5, the image comparison unit 30 detects a size of the character area in the label image in step 301. The shapes and the sizes of the characters included in the wine label are diverse. Therefore, the entire character area itself detected during the character recognition process can be the characteristic for the discrimination of the image. The size of the label image can be differentiated according to a photographing distance, so that a ratio of a horizontal length of the character area to a vertical length of the character area is defined as a size characteristic. With regard to this, the horizontal length of the character area is a horizontal length of the entire character string included in the wine label and the vertical length of the character area is also the vertical length of the entire character string included in the wine label. For example, the ratio of the horizontal length to the vertical length of the character area 501 of FIG. 15 is the size characteristic.

Then, the image comparison unit 30 detects a color characteristic of the label image in step 303. The characteristic, which is most widely used in the contents based image retrieval, is the color. The color in an RGB channel has a great change in the color value according to light, so that there are many cases in which the similarity of the color is calculated as low. Therefore, it is preferred to use the color in a HSV channel, which is less insensitive to light than the RGB channel. Equations (5), (6), and (7) are used when the RGB colors are converted to the HSV (hue, saturation and value) colors, respectively.

$$H = \cos^{-1}\left\{\frac{\frac{1}{2}[(R-G)+(R-B)]}{\sqrt{(R-G)^2+(R-B)(G-B)}}\right\} \quad (5)$$

$$S = 1 - \frac{3}{R+G+B}[\min(R, G, B)] \quad (6)$$

$$V = \frac{1}{3}(R+G+B) \quad (7)$$

The present invention uses a color histogram in the derivation of the color characteristic. A value of the H component in the histogram of the HSV color space is segmented into 18 sections, the S component is segmented into 3 sections, and the V component is segmented into 8 sections, so that the color histogram of a total of 432 dimensions is defined.

The image comparison unit 30 counts the number of pixels corresponding to each of the histograms, among the pixels included in the label image, and extracts the color characteristic.

Then, the image comparison unit 30 detects a design of the character in step 305. In order to extract a shape characteristic of the character, the image comparison unit 30 has to first detect edges of the characters. The sizes of the characters are diverse, so that in order to normalize the sizes, the size of the character area is converted into a predetermined size, e.g. 256×256 size (in pixels), as shown in FIG. 15, and then extracts the edges. In order to extract the characteristic of the character design, a horizontal projection histogram in the edge detection image is used. When the horizontal component is used, a quantity of the histogram is changed according to the number and the kind of the characters, so that it is possible to measure the similarity.

When the image characteristic extraction from the label image has been completed, the image comparison unit 30 compares the extracted image characteristic with an image characteristic of each of the reference wine label images included in the preliminary label candidate group and retrieves the reference label images having the high similarity, to constitute the final label candidate group.

The present invention uses the sum of the similarities of three characteristics as an image characteristic similarity. The first characteristic (the size of the character area) uses the ratio of the sizes of the character areas as the similarity, and the second characteristic (color histogram) and the third characteristic (edge histogram) uses the Euclidean distance as the similarity.

The calculation of the image characteristic similarity is expressed by Equations (8) to (11).

In the following equations, Q represents the image characteristic extracted from the label image and D is an image characteristic value of the reference label image included in the label database. Also, r represents a size characteristic, and CH and EH refer to the color histogram and the edge histogram, respectively. In order to normalize the similarity value of each of the color characteristics and the design characteristic, the color histogram is obtained by calculating histogram values segmented by the total number of pixels of the image. Further, the edge histogram is obtained by calculating the Euclidian distance of histogram values segmented by 255, which is the number of columns in a single row, and then segmenting again the calculated Euclidian distance by 256, which is the number of rows. W represents the weight of each characteristic. $sim_r$ represents a similarity of a size characteristic, $sim_c$ represents a similarity of a color characteristic, $sim_e$ represents a similarity of a design characteristic, and sim represents a similarity of a final image characteristic. As the value calculated by Equations (8) to (11) becomes lower, the similarity is higher.

$$sim_r = Q_r - D_r \quad (8)$$

$$sim_c = \sqrt{\sum_{i=1}^{432}\left(\frac{Q_{CH_i}}{n \times m} - \frac{D_{CH_i}}{n \times m}\right)} \quad (9)$$

$$sim_e = \sqrt{\frac{\sum_{i=1}^{256}\left(\frac{Q_{EH_i}}{256} - \frac{D_{EH_i}}{256}\right)^2}{256}} \quad (10)$$

$$sim = w_1 sim_r + w_2 sim_c + w_3 sim_e \quad (11)$$

Returning to FIG. 3, when the image comparison unit 30 provides the retrieval unit 10 with the final label candidate group, the retrieval unit 10 provides the reference wine label images included in the final label candidate group and wine information corresponding to the wine label through the display unit 70. This example is illustrated in FIG. 16.

Figure 16:
FIG. 16 illustrates a screen showing a label retrieval result according to an embodiment of the present invention.

FIG. 16 illustrates a wine label retrieval result 603 with respect to the photographed label image 601. In FIG. 16, the wine label retrieval result 603 includes only reference wine label images detected in the label database 50. However, when the wine label image is selected, the corresponding wine information is detected in the label database 50 and is displayed. Then, the multiple reference wine label images may be displayed in a sequence representing the higher similarity.

Accordingly, the present invention can retrieve wine labels by using a portable terminal, e.g. a mobile phone, a PDA (Personal Digital Assistant), or the like, so that it is possible to retrieve the wine label and provide wine information anytime and anywhere regardless of a place and a time. Further, the present invention can retrieve the corresponding wine label by using the wine label image obtained through a camera mounted in the portable terminal. Furthermore, the present invention can rapidly and accurately provide the wine information.

While the present invention has been shown and described with reference to certain exemplary embodiments and drawings thereof, it will be understood by those skilled in the art that various changes in form and details may be made therein without departing from the spirit and scope of the invention. For example, according to the present invention, the label database is included in the label retrieval apparatus, but can be included in a separated apparatus. In this case, the label retrieval apparatus accesses the label database, so as to obtain the necessary information. Therefore, it would be appreciated by those skilled in the art that the scope of the present invention should be defined in the claims and their equivalents, not by the embodiments of the present invention.

What is claimed is:

1. A method for retrieving a label using a label retrieval apparatus, the method comprising the steps of:

obtaining a label image photographed through a camera;

extracting characters included in the label image and recognizing the extracted characters;

detecting at least one label including the recognized character from a label database including multiple labels and information on the multiple labels;

generating a preliminary label candidate group including the at least one label;

detecting an image characteristic of the label image;
detecting at least one label having an image characteristic, which is similar to the detected image characteristic, from the preliminary label candidate group;
generating a final label candidate group including the at least one label having the image characteristic, which is similar to the detected image characteristic; and
providing each of the at least one label included in the final label candidate group and detailed information corresponding to each of the at least one label included in the final label candidate group.

2. The method as claimed in claim 1, wherein recognizing the extracted character comprises:
wavelet transforming the label image and extracting a character candidate area by using a horizontal frequency transform component, a vertical frequency transform component, and a diagonal frequency transform component;
binarizing the character candidate area;
segmenting the binarized character candidate area into a character area including an actual character and a background area;
detecting the character area;
correcting an inclination of the character area;
segmenting the character area into multiple segmented character areas;
generating multiple combined characters based on the multiple segmented character areas;
generating multiple candidate character strings based on by using the multiple combined characters; and
comparing the multiple candidate character strings with label character strings included in the label database and outputting a candidate character string having a high similarity as a final recognition result.

3. The method as claimed in claim 2, wherein in the step of correcting the inclination of the character area, in multiple horizontal runs of the character area, when a length of a predetermined run is longer than an average length of a run, the predetermined run is omitted, remaining runs are connected and generated as a single segment, a segment including one run is determined to have no special information to be ignored, and an inclination of a segment including at least two runs is measured and corrected.

4. The method as claimed in claim 3, wherein segmenting the character area into the multiple segmented character areas comprises:
using a characteristic of the horizontal run to segment the character area into the multiple character areas;
when a number of pixels of the segmented area is greater than or equal to a maximum threshold, determining the segmented area to be an effective character area;
when the number of pixels of the segmented area is less than the maximum threshold and greater than or equal to a minimum threshold, determining the segmented area to be a character piece area;
when the number of pixels of the segmented area is less than the minimum threshold, determining the segmented area to be a noise area; and
removing the noise area and combining the character piece area with the effective character area located on a same vertical line.

5. The method as claimed in claim 4, wherein generating the multiple combined characters comprises:
combining the segmented characters and generating temporal combined characters;
performing an MLP (Multi Layer Perceptron) process for each of the temporal combined characters;
recognizing the temporal combined character as a specific character;
evaluating a correctness of the specific character by using an SVD (Singular Value Decomposition) process; and
generating the multiple combined characters including combined characters having a predetermined similarity ranking or higher.

6. The method as claimed in claim 1, wherein detecting the image characteristic of the label image comprises:
detecting a ratio of a horizontal length of the character area to a vertical length of the character area of the label image as a size characteristic;
detecting a color characteristic of the label image;
detecting edges of the characters included in the label image; and
detecting a design characteristic.

7. The method as claimed in claim 1, wherein the label includes a wine label.

8. A label retrieval apparatus comprising:
a camera;
a label database including multiple labels and information on the multiple labels;
a character recognition unit for extracting characters included in a label image obtained through the camera, recognizing the extracted characters, and outputting a recognition result;
a retrieval unit for detecting at least one label including the recognized characters from the label database by using the recognition result input from the character recognition unit and generating a preliminary label candidate group including the at least one label; and
an image comparison unit for detecting an image characteristic of the label image, detecting at least one label having an image characteristic similar with the detected image characteristic from the preliminary label candidate group, and generating a final label candidate group including the at least one label having the image characteristic similar with the detected image characteristic from the preliminary label candidate group,
wherein the retrieval unit provides each of the at least one label included in the final label candidate group and detailed information corresponding to each of the at least one label included in the final label candidate group.

9. The label retrieval apparatus as claimed in claim 8, wherein the character recognition unit comprises:
a character area detection module for wavelet transforming the label image, extracting a character candidate area based on a horizontal frequency transform component, a vertical frequency transform component, and a diagonal frequency transform component, binarizing the character candidate area and segmenting the binarized character candidate area into a character area constituting an actual character and a background area, and detecting the character area;
a character segmentation module for correcting an inclination of the character area and segmenting the character area into multiple segmented character areas; and
a character recognition module for generating multiple combined characters based on the multiple segmented character areas, generating multiple candidate character strings by using the multiple combined characters, comparing the multiple candidate character strings with label character strings included in the label database, and outputting a candidate character string having a high similarity as a final recognition result.

10. The label retrieval apparatus as claimed in claim 9, wherein, in multiple horizontal runs of the character area, when a length of a predetermined run is longer than an average run length, the character segmentation module deletes the predetermined run, connects remaining runs with each other and generates a single section, determines that a section including one run does not have special information to ignore the section, and measures and corrects an inclination of a section including at least two runs.

11. The label retrieval apparatus as claimed in claim 10, wherein the character segmentation module segments the character area into multiple character areas based on a characteristic of the horizontal run, determines the segmented area to be an effective character area when a number of pixels of the segmented area is greater than or equal to a maximum threshold, determines the segmented area to be a character piece area when the number of pixels of the segmented area is less than the maximum threshold and greater than or equal to a minimum threshold, and determines the segmented area to be a noise area when the number of pixels of the segmented area is less than the minimum threshold, and the character segmentation module deletes the noise area and combines the character piece area with the effective character area located on a same vertical line, to segment the character area into the multiple segmented character areas.

12. The label retrieval apparatus as claimed in claim 11, wherein the character recognition module combines the segmented characters and generates multiple temporal combined characters, performs an MLP (Multi Layer Perceptron) process for the multiple temporal combined characters and recognizes a temporal combined character as a specific character, evaluates a correctness of the specific character based on an SVD (Singular Value Decomposition) process, and generates the multiple combined characters including combined characters having a similarity in a predetermined ranking or higher.

13. The label retrieval apparatus as claimed in claim 12, wherein the image comparison unit detects a ratio of a horizontal length of the character area to a vertical length of the character area in the label image as a size characteristic, detects a color characteristic of the label image, and detects edges of the characters included in the label image and detects a design character.

14. The label retrieval apparatus as claimed in claim 9, wherein the label includes a wine label.

* * * * *